UNITED STATES PATENT OFFICE.

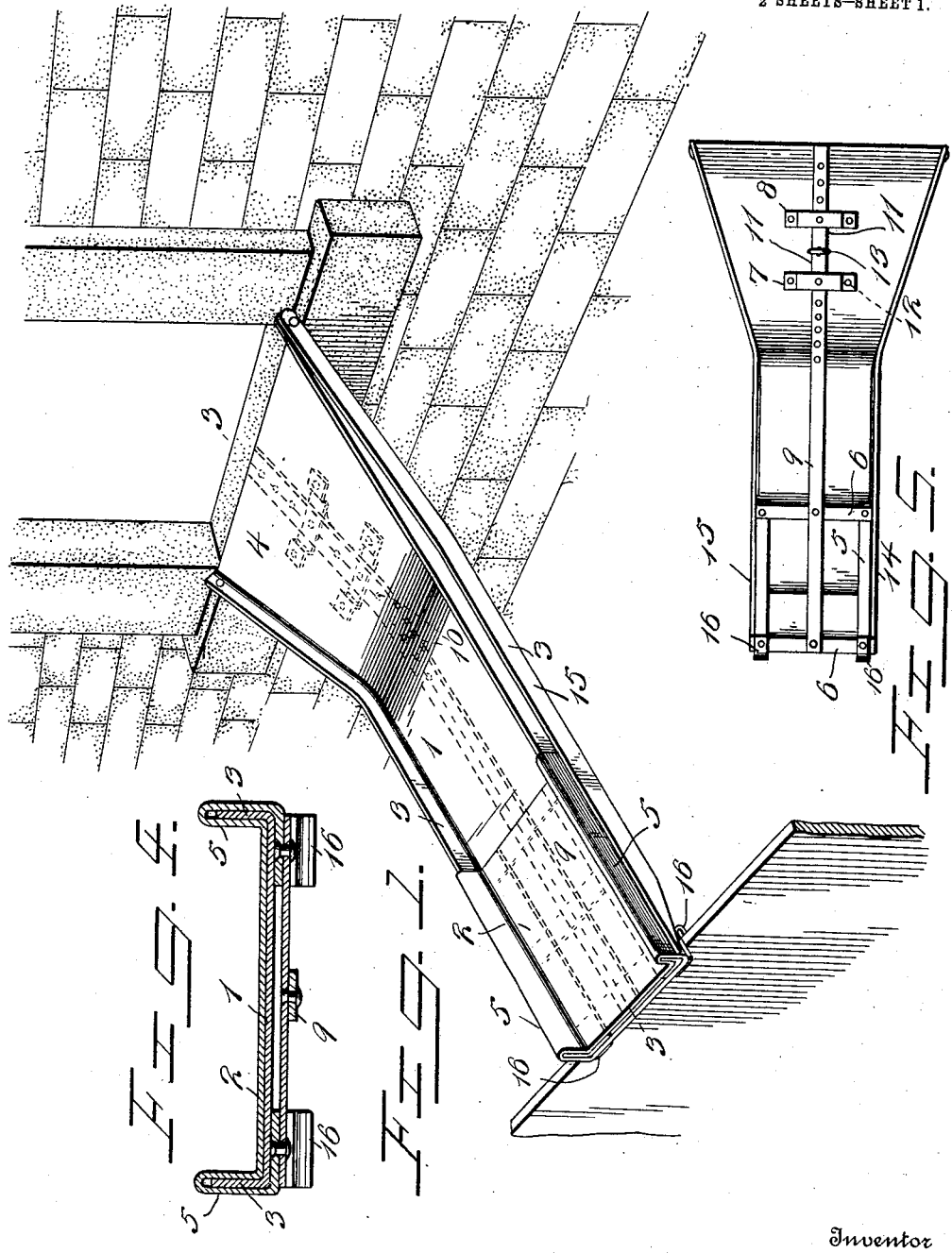

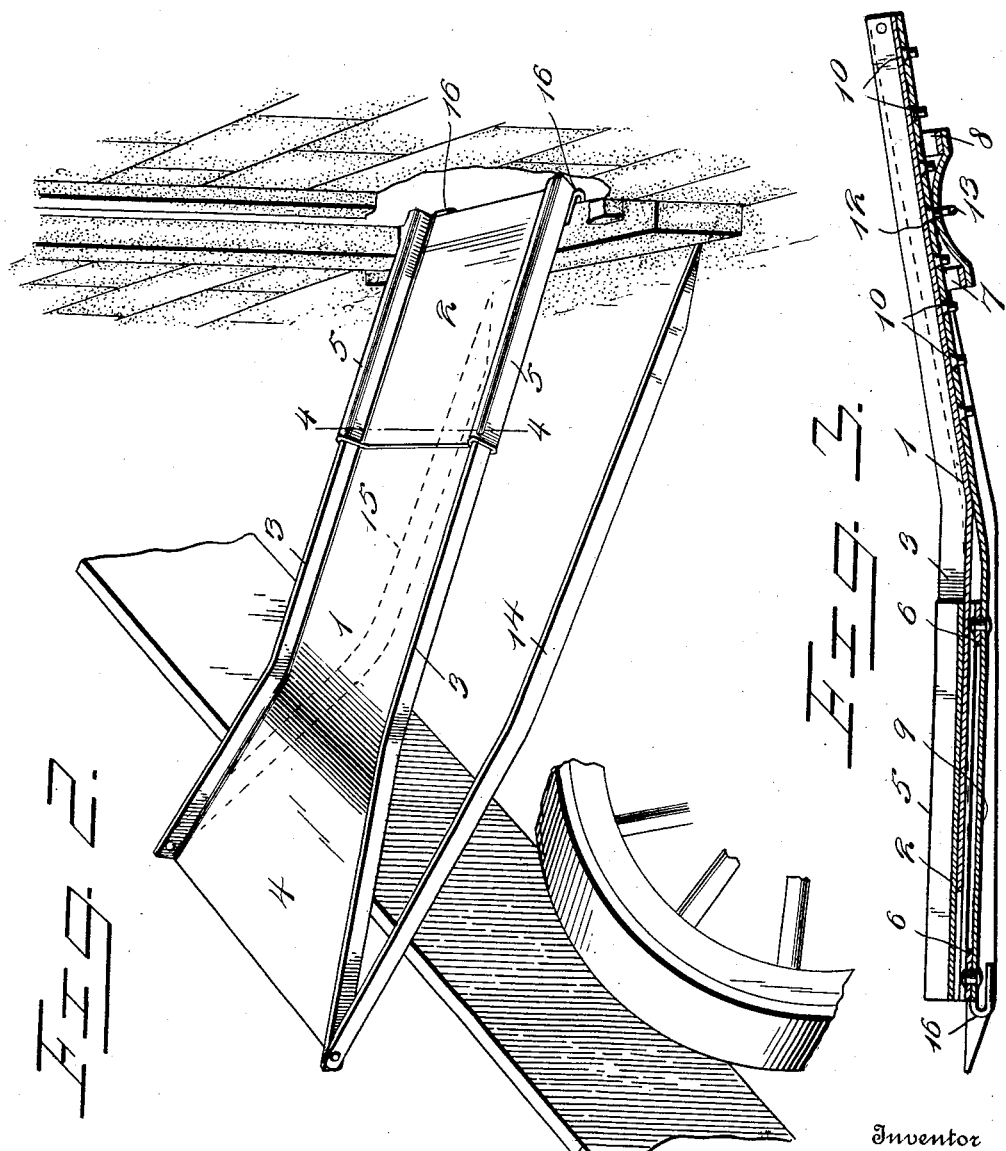

JOHN B. THOMPSON, OF JUNIATA, NEBRASKA.

CHUTE.

1,033,492.                    Specification of Letters Patent.          Patented July 23, 1912.

Application filed August 25, 1911.   Serial No. 646,057.

*To all whom it may concern:*

Be it known that I, JOHN B. THOMPSON, a citizen of the United States, residing at Juniata, in the county of Adams, State of Nebraska, have invented certain new and useful Improvements in Chutes; and I do hereby declare the following to be a full, clear, and exact description of the invention, such as will enable others skilled in the art to which it appertains to make and use the same.

My invention relates to new and useful improvements in chutes and more especially to extensible chutes for use in handling grain or the like, and the object of my invention is to improve the construction and increase the efficiency of chutes of the above described character.

A further object of my invention is to provide a chute having a telescoping member whereby the length of the chute may be varied at will and also to provide means for securing the telescoping members in adjusted position.

A still further object of my invention is to provide a chute which may be used equally as well either for conveying grain from a wagon to a bin inside the granary, or for conveying grain from the bin to the wagon.

With these and other objects in view my invention will be more fully described, illustrated in the accompanying drawings which show a preferred embodiment of my chute and then specifically pointed out in the claims which are attached to and form a part of this application.

In the accompanying drawings:—Figure 1 is a perspective view showing my chute employed for loading grain into a wagon. Fig. 2 is a like view showing the chute employed in unloading the wagon. Fig. 3 is a longitudinal section on the line 3—3 of Fig. 2, and Fig. 4 is a transverse section on the line 4—4 of Fig. 2. Fig. 5 is an underneath view of the chute.

Referring more specifically to the drawings in which similar reference numerals designate corresponding parts throughout, my chute will be seen to consist primarily of a main trough member designated as a whole by the numeral 1 and an auxiliary trough member 2 which is telescopically and adjustably secured to the former. The main trough member is preferably formed from a single piece of relatively heavy sheet metal having its longitudinal edges bent upwardly at right angles to the body to form sides 3, one end of this trough being widened as shown at 4 to form a fan-shaped receiving mouth. The auxiliary trough is also preferably formed from a single piece of sheet metal and as best shown in Fig. 4 of the drawings is constructed by bending the longitudinal side portions of the metal back upon itself in parallel spaced relation to form loop portions 5 which are then bent intermediate their length at right angles to form L-shaped slides or guide ways, said trough being so proportioned that the sides of the main trough may be inserted in the L-shaped guides thus formed whereby the auxiliary trough will be slidably mounted upon the main trough. As a means to stiffen this auxiliary trough and hold the guides in proper spaced relation I have secured the guides together by means of transversely extending strips of metal 6 positioned one at either end of the trough. These two strips are as a rule sufficient to hold the trough but for a long trough if deemed necessary, additional strips may be employed, these strips or braces may be secured to the auxiliary trough either by means of bolts or by rivets, the latter, however being preferable as there are no nuts to work loose under the constant racking to which the trough is subjected.

As a means for adjustably securing the auxiliary trough in position upon the main trough spaced apart transversely extending loops 7 and 8 are riveted upon the lower face of the fan-shaped portion of the main trough to form alined guide ways in which is slidably mounted a longitudinally extending strip of metal 9 one end of which terminates flush with the outer end of the auxiliary trough through which it is secured by means of rivets passed through the strip and through the reinforcing or brace strips of the latter. The other end of the strip, namely that end which is slidable in the guide loops is provided with a plurality of downwardly extending spaced apart studs 10 and a bowed spring member 11 which is firmly secured by its ends to the outer faces of the guide loops and is provided with a centrally located aperture 12 adapted to engage over any one of these studs to firmly hold the strip in adjusted position. By this means the auxiliary trough may be extended to any required distance and then firmly secured in place by means of the perforated spring. To facilitate matters this spring is provided intermediate its length with a downwardly extending ring 13 by which means the operator may readily draw the spring out of engagement with the studs.

Swingingly secured to the sides of the mouth of the main trough are strips 14 and 15 of stiff metal which in operation, are adapted to be swung downwardly to act as props for supporting the chute, as will be hereinafter fully explained. Reversibly secured to the ends of that strip 6 which connects the guides at the free end of the auxiliary trough are hooks 16 adapted to coact with the props above described to firmly hold the chute in position.

The operation of my improved chute is clearly shown in Figs. 1 and 2 of the drawings and therefore needs but slight description. In loading grain into the wagon the chute is positioned with its wider end resting against the side of the granary and across the window thereof while its narrower end rests upon the wagon box with its hooks turned outwardly to engage against the outer face thereof. When used in unloading grain from the wagon the position of the chute is reversed, the narrower end of the chute being passed through the granary window with its hooks turned to engage against the inner face of the wall thereof while the supporting legs are swung downwardly and engaged against the sides of the granary as shown, thus supporting the wider end of the chute above the ground in position for the wagon to be driven beneath the same.

Of course it will be understood that merely because I have described two ways of employing this chute I do not in any way limit myself to its use in these particular ways, as it may be employed in any preferred manner without in the slightest degree departing from the spirit of my invention.

What is claimed, is:—

1. A chute, comprising a main trough member having a fan-shaped receiving mouth, props pivoted to the sides of said mouth and adapted to be swung into and out of operative position, an auxiliary trough telescopically mounted on the main trough and extending beyond the same, means for adjustably securing said auxiliary trough in position, and hooks reversibly secured to the extended end of said auxiliary trough.

2. A chute comprising a main trough member, props pivoted to the sides of said member, an auxiliary trough telescopically mounted on the main trough and extending beyond the same, guide loops carried by the main trough, an adjusting member having one end secured to the auxiliary trough and the other end slidable through said loops, said member being provided with a series of spaced apart apertures, and a bowed spring secured to said loops and having a stud adapted to engage in said aperture.

In testimony whereof, I affix my signature, in presence of two witnesses.

JOHN B. THOMPSON.

Witnesses:
G. E. WILSON,
D. B. MARTI.